(12) United States Patent
Ishii et al.

(10) Patent No.: US 11,024,853 B2
(45) Date of Patent: *Jun. 1, 2021

(54) NONAQUEOUS ELECTROLYTE SECONDARY CELL AND METHOD FOR MANUFACTURING NONAQUEOUS ELECTROLYTE SECONDARY CELL

(71) Applicant: TOYOTA JIDOSHA KABUSHIKI KAISHA, Toyota (JP)

(72) Inventors: Kenta Ishii, Seto (JP); Masahiro Morita, Nagoya (JP); Risa Sato, Toyota (JP); Ryo Hanasaki, Toyota (JP); Yusuke Onoda, Toyota (JP); Koji Takahata, Nissin (JP); Atsushi Watarai, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 40 days.

This patent is subject to a terminal disclaimer.

(21) Appl. No.: 16/214,948

(22) Filed: Dec. 10, 2018

(65) Prior Publication Data

US 2019/0181455 A1    Jun. 13, 2019

(30) Foreign Application Priority Data

Dec. 11, 2017 (JP) .............................. JP2017-236793

(51) Int. Cl.
*H01M 10/0525* (2010.01)
*H01M 10/0567* (2010.01)
(Continued)

(52) U.S. Cl.
CPC .......... *H01M 4/628* (2013.01); *H01M 4/366* (2013.01); *H01M 4/485* (2013.01); *H01M 4/505* (2013.01);
(Continued)

(58) Field of Classification Search
None
See application file for complete search history.

(56) References Cited

U.S. PATENT DOCUMENTS

2012/0308881 A1  12/2012  Tokuda et al.
2016/0211553 A1   7/2016  Ito et al.
(Continued)

FOREIGN PATENT DOCUMENTS

EP         3454396 A1    3/2019
JP      2011-187440 A    9/2011
(Continued)

OTHER PUBLICATIONS

Communication dated Jun. 8, 2020, from the United States Patent and Trademark Office in U.S. Appl. No. 16/214,264.

(Continued)

*Primary Examiner* — Jonathan Crepeau
(74) *Attorney, Agent, or Firm* — Sughrue Mion, PLLC

(57) ABSTRACT

According to the present disclosure, there is provided a technique making it possible to improve suitably the performance of a nonaqueous electrolyte secondary cell in which a SEI film is formed on the surface of a negative electrode active material. The nonaqueous electrolyte secondary cell disclosed herein includes a positive electrode 10, a negative electrode 20, and a nonaqueous electrolytic solution, wherein a negative electrode SEI film 29 including at least a LiBOB skeleton and a fluorosulfonic acid skeleton is formed on the surface of a negative electrode active material 28, and a positive electrode SEI film 19 including at least a phosphoric acid skeleton is formed on the surface of a positive electrode active material 18. Where the component amount of the LiBOB skeleton in the negative electrode SEI film 29 is denoted by $I_B$, the component amount of the fluorosulfonic acid skeleton in the negative electrode SEI film 29 is denoted by $I_S$, and the component (Continued)

amount of the phosphoric acid skeleton in the positive electrode SEI film 19 is denoted by $I_P$, a formula of $4 \leq I_B/I_S \leq 10$ and a formula of $5 \, \mu mol/m^2 \leq I_P \leq 15 \, \mu mol/m^2$ are satisfied.

1 Claim, 4 Drawing Sheets

(51) Int. Cl.
| | |
|---|---|
| *H01M 4/485* | (2010.01) |
| *H01M 4/587* | (2010.01) |
| *H01M 4/62* | (2006.01) |
| *H01M 10/44* | (2006.01) |
| *H01M 4/525* | (2010.01) |
| *H01M 4/505* | (2010.01) |
| *H01M 4/36* | (2006.01) |
| *H01M 10/0585* | (2010.01) |

(52) U.S. Cl.
CPC .......... *H01M 4/525* (2013.01); *H01M 4/587* (2013.01); *H01M 10/0525* (2013.01); *H01M 10/0567* (2013.01); *H01M 10/0585* (2013.01); *H01M 10/446* (2013.01); *H01M 2300/0025* (2013.01)

(56) References Cited

U.S. PATENT DOCUMENTS

| | | | |
|---|---|---|---|
| 2016/0226106 A1 | 8/2016 | Minami et al. | |
| 2016/0380303 A1 | 12/2016 | Minami et al. | |
| 2017/0222268 A1 | 8/2017 | Abe et al. | |
| 2019/0013543 A1* | 1/2019 | Tao | H01M 4/366 |

FOREIGN PATENT DOCUMENTS

| | | |
|---|---|---|
| JP | 2015-37012 A | 2/2015 |
| JP | 2015125858 A | 7/2015 |
| JP | 2016-27574 A | 2/2016 |
| JP | 2016-143454 A | 8/2016 |
| JP | 2016146341 A | 8/2016 |
| JP | 2016-184462 A | 10/2016 |
| JP | 2017-10819 A | 1/2017 |
| WO | 2016/009994 A1 | 1/2016 |

OTHER PUBLICATIONS

Communication dated Jun. 8, 2020, from the United States Patent and Trademark Office in U.S. Appl. No. 16/214,853.
U.S. Appl. No. 16/214,853, filed Dec. 10, 2018.
U.S. Appl. No. 16/214,264, filed Dec. 10, 2018.
Notice of Allowance dated Oct. 9, 2020, from the United States Patent and Trademark Office in U.S. Appl. No. 16/214,264.
Notice of Allowance dated Oct. 8, 2020, from the United States Patent and Trademark Office in U.S. Appl. No. 16/214,853.
Corrected Notice of Allowance dated Nov. 16, 2020, from the United States Patent and Trademark Office in U.S. Appl. No. 16/214,853.

\* cited by examiner

NONAQUEOUS ELECTROLYTE SECONDARY CELL AND METHOD FOR MANUFACTURING NONAQUEOUS ELECTROLYTE SECONDARY CELL

BACKGROUND

1. Technical Field

The present disclosure relates to a nonaqueous electrolyte secondary cell, more specifically to a nonaqueous electrolyte secondary cell including a positive electrode, a negative electrode, and a nonaqueous electrolytic solution. The present application claims priority based on Japanese Patent Application No. 2017-236793 filed on Dec. 11, 2017, the entire contents of which are incorporated herein by reference.

2. Description of the Related Art

In recent years, nonaqueous electrolyte secondary cells such as lithium ion secondary cells have been suitably used as so-called portable power sources for personal computers and portable terminals and power sources for driving vehicles. Among such nonaqueous electrolyte secondary cells, lithium-ion secondary cells that are lightweight and capable of obtaining high energy density have gained particular importance as high-output power sources (for example, a power source for driving a motor connected to the driving wheel of a vehicle) suitable for vehicles such as electric vehicles and hybrid vehicles.

In such a nonaqueous electrolyte secondary cell (hereinafter also simply referred to as "cell"), a part of the non-aqueous electrolytic solution (hereinafter also simply referred to as "electrolytic solution") is decomposed at the time of initial charge, and a coating film called a solid electrolyte interface (SEI) film may be formed on the surface of the negative electrode active material. When this SEI film is formed, the negative electrode is stabilized, so that subsequent decomposition of the electrolytic solution is suppressed.

However, since the decomposition of the electrolytic solution is an irreversible reaction, it causes a decrease in cell capacity. For this reason, in recent years, various techniques for adding in advance an additive which decomposes at or below the decomposition potential of the electrolytic solution to form an SEI film (hereinafter referred to as "film forming agent") and forming the SEI film derived from the film forming agent on the surface of the negative electrode active material have been suggested.

For example, Japanese Patent Application Publication No. 2016-184462 discloses a nonaqueous electrolytic solution including lithium bis(oxalato)borate (hereinafter also referred to as "LiBOB") as a film forming agent. In addition to this LiBOB, the nonaqueous electrolytic solution disclosed in Japanese Patent Application Publication No. 2016-184462 includes lithium hexafluorophosphate, a salt having an F—S bond in a molecule, and a salt having a P—F bond in a molecule (except for lithium hexafluorophosphate).

SUMMARY

Incidentally, in recent years, there has been an increasing demand for improvement in cell performance of a nonaqueous electrolyte secondary cell so that the cell could be used more suitably for a high-output power source for vehicles and the like. It is also desirable that the technique of forming the SEI film derived from the film forming agent (LiBOB) be improved for further improvement of cell performance.

The present disclosure has been accomplished in response to such a demand, and it is an object of the present disclosure to provide a technique that can more suitably improve the performance of a nonaqueous electrolyte secondary cell in which a LiBOB-derived SEI film is formed on the surface of a negative electrode active material.

In order to achieve the above object, a nonaqueous electrolyte secondary cell having the following configuration is provided as one aspect of the present disclosure.

The nonaqueous electrolyte secondary cell disclosed herein includes a positive electrode having a positive electrode active material made of a lithium transition metal complex oxide, a negative electrode having a negative electrode active material made of a carbon material, and a nonaqueous electrolytic solution including a nonaqueous solvent and a supporting salt.

In such a nonaqueous electrolyte secondary cell, a negative electrode SEI film including at least a LiBOB skeleton and a fluorosulfonic acid skeleton is formed on a surface of the negative electrode active material, and a positive electrode SEI film including at least a phosphoric acid skeleton is formed on a surface of the positive electrode active material.

Further, in the nonaqueous electrolyte secondary cell disclosed herein, where a component amount of the LiBOB skeleton in the negative electrode SEI film is denoted by $I_B$, a component amount of the fluorosulfonic acid skeleton in the negative electrode SEI film is denoted by $I_S$, and a component amount of the phosphoric acid skeleton in the positive electrode SEI film is denoted by $I_P$, the following formulas (1) and (2) are satisfied.

$$4 \leq I_B/I_S \leq 10 \tag{1}$$

$$5\ \mu mol/m^2 \leq I_P \leq 15\ \mu mol/m^2 \tag{2}$$

The inventors of the present disclosure have conducted comprehensive research in order to more suitably improve the cell performance of a nonaqueous electrolyte secondary cell in which an SEI film is formed by a film forming agent (LiBOB) as compared with the conventional cells.

As a result of such research, it was found that in a cell in which a LiBOB-derived SEI film is formed, there is a trade-off relationship with the component amount of LiBOB. Specifically, as described above, since LiBOB is a film forming agent for preventing a decrease in cell capacity due to SEI film formation, when the component amount of the LiBOB skeleton in the SEI film decreases, decomposition reaction of the electrolytic solution may proceed and the cell capacity may decrease. Meanwhile, the inventors of the present disclosure have found that where the component amount of the LiBOB skeleton in the SEI film becomes too large, the cell resistance may rise. This is because where the component amount of the LiBOB skeleton becomes too large, the movement speed of Li ions on the surface of (or inside) the SEI film decreases.

The inventors of the present disclosure considered creating a technique capable of solving the above-mentioned trade-off relationship, that is, a technique capable of forming an SEI film which includes sufficient amount of LiBOB but in which the decrease in the movement speed of Li ions by LiBOB is suitably suppressed. Then, as a result of various experiments and studies, it was found that when a fluorosulfonic acid skeleton is present in the SEI film, the movement speed of Li ions in the SEI film increases.

Based on these findings, the inventors of the present disclosure considered adjusting the ratio of the "component amount $I_B$ of the LiBOB skeleton" and the "component amount $I_B$ of the fluorosulfonic acid skeleton" in the SEI film formed on the surface of the negative electrode active material (hereinafter referred to as "negative electrode SEI film") and came up with the idea of forming a negative electrode SEI film in which $I_B/I_S$ is adjusted so as to satisfy the above formula (1).

Further, the inventors of the present disclosure have also conducted an investigation aimed at further performance improvement of nonaqueous electrolyte secondary cells in addition to the improvement described above.

As a result, the inventors of the present disclosure have found that in a general nonaqueous electrolyte secondary cell, a transition metal element is eluted from a positive electrode active material (lithium transition metal complex oxide), and where the eluted transition metal element precipitates on the surface of a negative electrode active material, the reaction resistance at the negative electrode increases. It was thought that a nonaqueous electrolyte secondary cell having higher performance could be provided if the elution of the transition metal element from the positive electrode active material could be prevented.

As a result of subsequent comprehensive investigation, it has been found that by forming an SEI film on the surface of a positive electrode active material (hereinafter referred to as "positive electrode SEI film") and causing a phosphoric acid skeleton to be present in the positive electrode SEI film, the elution of the transition metal element from the positive electrode active material could be prevented.

However, it was understood that when a positive electrode SEI film including such a phosphoric acid skeleton is actually formed, where the positive electrode SEI film is formed in excess, there is a possibility that the movement speed of Li ions in the positive electrode will decrease and the cell resistance will increase.

Therefore, the inventors of the present disclosure have performed repeated testing to investigate a positive electrode SEI film capable of suitably preventing the elution of a transition metal element and also ensuring the movement speed of Li ions, and came up with an idea of forming a positive electrode SEI film in which the component amount $(I_P)$ of the phosphoric acid skeleton was adjusted to satisfy the above formula (2).

In the nonaqueous electrolyte secondary cell disclosed herein, which is accomplished on the basis of the above-described information, a negative electrode SEI film satisfying the formula (1) and a positive electrode SEI film satisfying formula 2 are formed. As a result, various types of cell performance can be exhibited at a high level, and the cell can be more suitably used for a high-output power source for vehicles and the like.

The "component amount ($I_B$) of the LiBOB skeleton" in the present specification, is a value obtained by measuring the component amount of boron (B) in the negative electrode by inductively coupled plasma (ICP) emission spectroscopic analysis and is a value (μmol/m$^2$) normalized with respect to the BET specific surface area (m$^2$/g) of the negative electrode active material. The "component amount ($I_S$) of the fluorosulfonic acid skeleton" is a value obtained by measuring the component amount of $FSO_3^-$ in the negative electrode by ion chromatography (IC) and is a value (μmol/m$^2$) normalized with respect to the BET specific surface area (m$^2$/g) of the negative electrode active material.

Meanwhile, the "component amount ($I_P$) of phosphoric acid skeleton" is obtained by measuring the total amount of $PO_3F^-$, $PO_2F_2^-$, $PO_4^{3-}$ in the positive electrode by ion chromatography (IC).

In addition, as another aspect of the technology disclosed herein, a method for manufacturing a nonaqueous electrolyte secondary cell is provided. The method disclosed herein comprising: a step of preparing a positive electrode having a positive electrode active material made of a lithium transition metal complex oxide, and a negative electrode having a negative electrode active material made of a carbon material; a step of preparing a nonaqueous electrolytic solution which including a LiBOB, a fluorosulfonate ($FSO_3Li$) and a lithium difluorophosphate ($LiPO_2F_2$); a step of housing the positive electrode and the negative electrode together with a nonaqueous electrolytic solution in a cell case and constructing a cell assembly; a step of performing initial charging processing on the cell assembly; and a step of performing aging treatment on the cell assembly performed the initial charging processing. Further, in the method disclosed herein, a charging rate of the initial charging is 1 C to 5 C, and a time of the aging treatment is 16 hours to 200 hours.

The inventors of the present disclosure found that when the conditions of initial charging or aging treatment were changed, the $I_B/I_S$ of the negative electrode SEI film and the $I_P$ of the positive electrode SEI film could change, as a result of an experiment. The method disclosed herein is accomplished on the basis of the above-described information. The method can form the negative electrode SEI film satisfying the formula (1) and a positive electrode SEI film satisfying formula (2), by setting the charging rate of the initial charging and the time of the aging treatment to the above-mentioned conditions.

DETAILED DESCRIPTION

Figure 1:
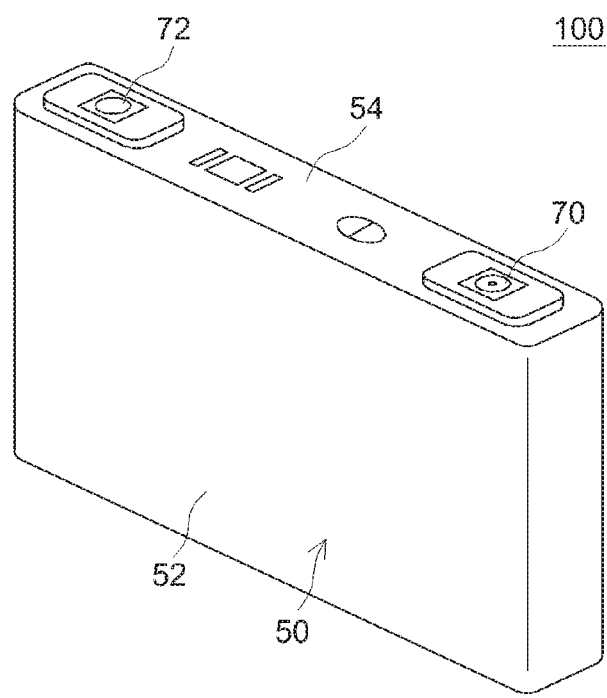
FIG. 1 is a perspective view schematically illustrating a lithium ion secondary cell according to one embodiment of the present disclosure.

Hereinafter, a nonaqueous electrolyte secondary cell according to one embodiment of the present disclosure will be described. In the drawings used for the following description, the same reference numerals are attached to the members/parts that exhibit the same action. The dimensional relationship (length, width, thickness, and the like) in each drawing does not reflect the actual dimensional relationship. In addition, matters other than matters particularly referred to in the present specification for the implementation of the present disclosure (for example, the structure of the cell case, the electrode terminal, and the like) can be grasped by a person skilled in the art as design matters based on the related art in the pertinent field.

1. Lithium Ion Secondary Cell

Figure 2:
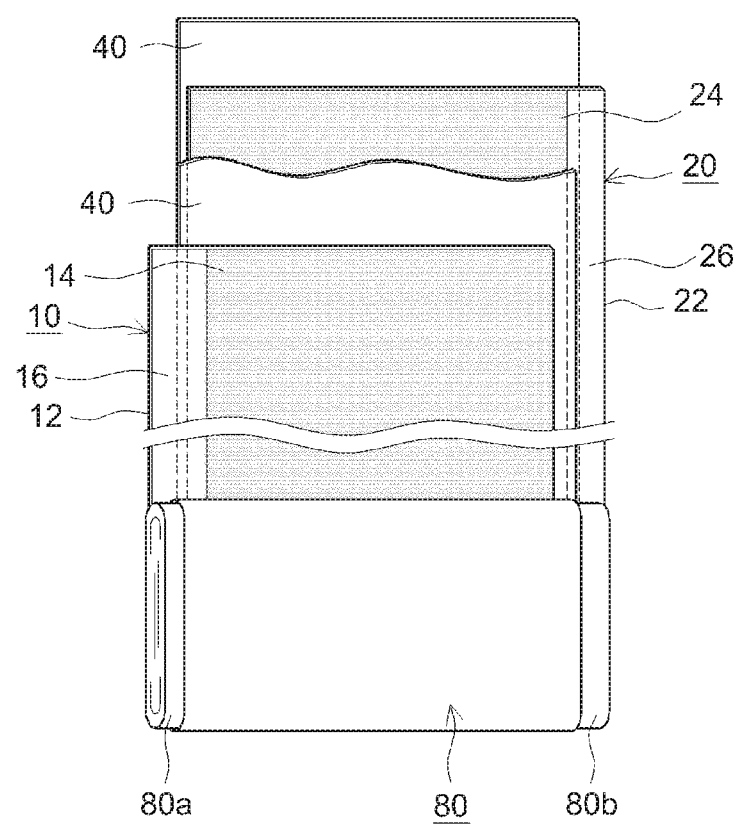
FIG. 2 is a perspective view schematically illustrating an electrode body of a lithium ion secondary cell according to one embodiment of the present disclosure.
Figure 3:
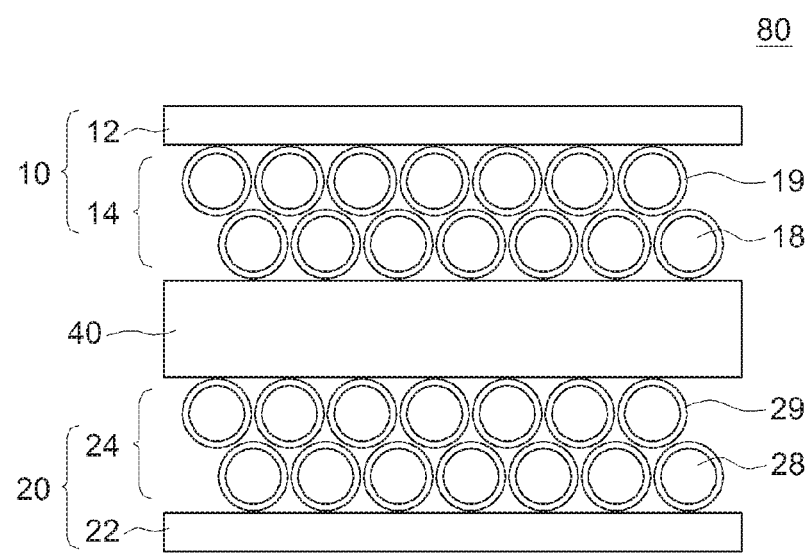
FIG. 3 is a schematic view for explaining the structure of positive and negative electrodes of a lithium ion secondary cell according to one embodiment of the present disclosure.

Hereinafter, a lithium ion secondary cell will be described as an example of the nonaqueous electrolyte secondary cell disclosed herein. FIG. 1 is a perspective view schematically illustrating a lithium ion secondary cell according to this embodiment. FIG. 2 is a perspective view schematically illustrating an electrode body of the lithium ion secondary cell according to this embodiment. FIG. 3 is a schematic view for explaining the structure of positive and negative electrodes of the lithium ion secondary cell according to this embodiment of the present disclosure.

(1) Cell Case

As depicted in FIG. 1, a lithium ion secondary cell 100 according to the present embodiment includes a flat prismatic cell case 50. This cell case 50 is composed of a flat case main body 52 having an open upper surface and a lid member 54 which closes the opening of the upper surface. A positive electrode terminal 70 and a negative electrode terminal 72 are provided on the lid member 54 forming the upper surface of the cell case 50.

(2) Electrode Body

In the lithium ion secondary cell 100 according to the present embodiment, an electrode body 80 depicted in FIG. 2 is housed inside the cell case 50 depicted in FIG. 1. As depicted in FIGS. 2 and 3, the electrode body 80 includes a positive electrode 10, a negative electrode 20, and a separator 40, and the positive electrode 10 and the negative electrode 20 are opposed to each other with the separator 40 interposed therebetween.

The electrode body 80 depicted in FIG. 2 is a wound electrode body formed by laminating the positive electrode 10 and the negative electrode 20 with the separator 40 interposed therebetween and winding the laminate. However, in the nonaqueous electrolyte secondary cell disclosed herein, any electrode body having a positive electrode and a negative electrode may be used, and the wound electrode body as depicted in FIG. 2 is not limiting. As another example of the electrode body, a laminated electrode body in which a plurality of positive electrodes, negative electrodes, and separators are laminated can be mentioned.

(a) Positive Electrode

Each member constituting the electrode body 80 will be specifically described below.

As depicted in FIG. 2, the positive electrode 10 is formed by applying a positive-electrode mixture layer 14 to the surface (for example, both surfaces) of a positive electrode current collector 12. Further, on one side edge portion of the positive electrode 10, a current collector exposed portion 16 to which the positive-electrode mixture layer 14 is not applied is formed. A positive electrode connecting portion 80a around which the current collector exposed portion 16 is wound is formed on one side edge portion of the electrode body 80. A positive electrode terminal 70 (see FIG. 1) is connected to the positive electrode connecting portion 80a. For the positive electrode current collector 12, an aluminum foil or the like is used.

As schematically depicted in FIG. 3, the positive-electrode mixture layer 14 includes a particulate positive electrode active material 18. The positive electrode active material 18 is constituted by a lithium complex oxide capable of occluding and releasing lithium ions. As the positive electrode active material 18 in the present embodiment, a lithium complex oxide (lithium transition metal complex oxide) including one or more transition metal elements is used. Examples of such a lithium transition metal complex oxide include lithium nickel complex oxide, lithium nickel cobalt complex oxide, lithium nickel cobalt manganese complex oxide, and the like.

Although not shown in the figure, the positive-electrode mixture layer 14 may include additives other than the positive electrode active material 18. Examples of such additives include a conductive material and a binder. As the conductive material, for example, a carbon material such as carbon black, for example, acetylene black (AB), graphite, or the like can be suitably used. As the binder, for example, polyvinylidene fluoride (PVdF), polyvinylidene chloride (PVdC), polyethylene oxide (PEO), or the like can be used.

Further, as depicted in FIG. 3, in the lithium ion secondary cell 100 according to the present embodiment, a positive electrode SEI film 19 is formed on the surface of the positive electrode active material 18. As will be described in detail later, the positive electrode SEI film 19 is a film derived from an oxofluorophosphate (such as $LiPO_2F_2$) added to a nonaqueous electrolytic solution, and phosphoric acid skeleton components ($PO_3F^-$, $PO_2F_2^-$, $PO_4^{3-}$) are present therein. By covering the surface of the positive electrode active material 18 with the positive electrode SEI film 19 including such phosphoric acid skeleton components, elution of transition metal elements (Ni, Co, Mn, and the like) from the positive electrode active material 18 can be suppressed. As a result, it is possible to prevent suitably the increase in reaction resistance due to precipitation of the transition metal elements on the surface of the negative electrode active material 28.

(b) Negative Electrode

As depicted in FIG. 2, the negative electrode 20 is formed by applying a negative-electrode mixture layer 24 to the surface (for example, both surfaces) of a negative electrode current collector 22. Further, on one side edge portion of the negative electrode 20, a current collector exposed portion 26 to which the negative-electrode mixture layer 24 is not applied is formed. A negative electrode connecting portion 80b around which the current collector exposed portion 26 is wound is formed on one side edge portion of the electrode body 80. A negative electrode terminal 72 (see FIG. 1) is connected to the negative electrode connecting portion 80b. For the negative electrode current collector 22, a copper foil or the like is used.

As depicted in FIG. 3, the negative-electrode mixture layer 24 includes a particulate negative electrode active material 28. The negative electrode active material 28 is constituted by a carbon material. For example, graphite, hard carbon, soft carbon, amorphous carbon or the like can be used. Further, the negative electrode active material 28 is not necessarily composed of a single carbon material, and may be composed of a composite material in which a plurality of carbon materials is compounded. For example, a composite material (amorphous coated spherical natural graphite) in which the surface of particulate natural graphite is coated with amorphous carbon can be used for the negative electrode active material 28.

In addition, the negative-electrode mixture layer 24 may include additives other than the negative electrode active material 28. Examples of such additives include a binder and a thickener. As the binder, for example, polyvinylidene fluoride (PVdF), styrene butadiene rubber (SBR) and the like can be used. As the thickener, for example, carboxymethyl cellulose (CMC) or the like can be used.

As schematically shown in FIG. 3, in the present embodiment, a negative electrode SEI film 29 is formed on the surface of the negative electrode active material 28. As will be described in detail later, the negative electrode SEI film 29 is a film derived from LiBOB and a fluorosulfonate (FSO$_3$Li and the like) in the nonaqueous electrolytic solution, and a LiBOB skeleton component (boron (B)) and fluorosulfonic acid skeleton component (FSO$_3^-$) are present therein. In this way, as a result of forming the negative electrode SEI film 29 derived from LiBOB, decomposition of the nonaqueous electrolytic solution during charge and discharge can be suppressed. Further, the fluorosulfonic acid skeleton component is present in the negative electrode SEI film 29 in the present embodiment. Therefore, the decrease in the movement speed of Li ions can be suitably prevented despite the inclusion of the LiBOB skeleton component.

(c) Separator

The separator 40 is disposed between the positive electrode 10 and the negative electrode 20. The separator 40 is a porous insulating sheet formed with a plurality of fine holes (pore diameter: about 0.01 μm to 6 μm) through which charge carriers (lithium ions) pass. As the separator 40, for example, an insulating resin such as polyethylene (PE), polypropylene (PP), a polyester, a polyamide, or the like can be used. The separator 40 may be a laminated sheet obtained by laminating two or more of the abovementioned resins. The thickness of the separator 40 is, for example, 5 μm to 40 μm, typically 10 μm to 30 μm, and 15 μm to 25 μm. Further, a heat resistant layer (HRL layer) including a metal oxide such as alumina (Al$_2$O$_3$) may be formed on the surface of the separator 40.

(3) Nonaqueous Electrolyte

Although not depicted in the figure, in the lithium ion secondary cell 100 according to the present embodiment, a nonaqueous electrolytic solution including a supporting salt in an organic solvent (nonaqueous solvent) is accommodated in the cell case 50 (see FIG. 1). In the present embodiment, additives (film forming agents) which are to be precursors of the positive electrode SEI film 19 and negative electrode SEI film 29 are added to the nonaqueous electrolytic solution. The composition of the nonaqueous electrolytic solution in the present embodiment will be described hereinbelow.

(A) Nonaqueous Solvent

As the nonaqueous solvent, for example, various organic solvents (for example, saturated cyclic carbonates, linear carbonates, linear carboxylic acid esters, cyclic carboxylic acid esters, ether-based compounds, sulfone-based compounds, and the like), which are used in electrolytic solutions for general lithium ion secondary cells, can be used without particular limitation. These organic solvents may be used singly or in combination of two or more thereof.

Among such nonaqueous solvents, specific examples of saturated cyclic carbonate include ethylene carbonate, propylene carbonate, butylene carbonate and the like. Specific examples of linear carbonates include dimethyl carbonate, diethyl carbonate, ethyl methyl carbonate, di-n-propyl carbonate, and the like. Examples of linear carboxylic acid esters include methyl acetate, ethyl acetate, n-propyl acetate, n-butyl acetate and the like. Examples of cyclic carboxylic acid esters include gamma butyrolactone, gamma valerolactone, gamma caprolactone, epsilon caprolactone and the like. Examples of ether compounds include diethyl ether, di(2-fluoroethyl) ether, di(2,2-difluoroethyl) ether and the like. Examples of the sulfone compound include 2-methylsulfolane, 3-methylsulfolane, 2-fluorosulfolane, 3-fluorosulfolane and the like.

(B) Supporting Salt

The supporting salt is used as a main electrolyte. For example, lithium salts such as LiPF$_6$, LiBF$_4$, LiClO$_4$ and the like can be suitably used for the supporting salt. The amount of such a supporting salt is not particularly limited so long as it does not significantly impair the effect of the present embodiments. Specifically, when LiPF$_6$ is used as the supporting salt, the lower limit of the molar amount of LiPF$_6$ is 0.5 mol/L or more, 0.6 mol/L or more, or even 0.7 mol/L or more. Further, the upper limit value is 3.0 mol/L or less, 2.0 mol/L or less, or even 1.5 mol/L or less. The range of the amount of LiPF$_6$ is 0.5 mol/L or more and 3.0 mol/L or less, 0.5 mol/L or more and 2.0 mol/L or less, or even 0.5 mol/L or more and 1.5 mol/L or less.

When the amount of LiPF$_6$ is within the above range, the total amount of ions in the nonaqueous electrolytic solution and the viscosity of the electrolytic solution can be appropriately balanced. As a result, the input/output characteristic can be more suitably improved without excessively lowering the ionic conductivity.

(C) Film Forming Agent

Further, as described above, film forming agents to be precursors for the positive electrode SEI film 19 and the negative electrode SEI film 29 are added to the nonaqueous electrolytic solution of the lithium ion secondary cell 100 according to the present embodiment. Specifically. LiBOB, a fluorosulfonate, and an oxofluorophosphate are included as film forming agents in the nonaqueous electrolytic solution according to the present embodiment. It is to be noted that the film forming agents described hereinbelow may be entirely used for forming the positive electrode SEI film 19 and the negative electrode SEI film 29, or a part thereof may remain in the nonaqueous electrolytic solution.

(c-1) LiBOB

The nonaqueous electrolytic solution in the present embodiment includes lithium bis(oxalato)borate (LiBOB). As a result of including LiBOB in the nonaqueous electrolytic solution, the negative electrode SEI film 29 having a LiBOB skeleton can be formed on the surface of the negative electrode active material 28.

Although described in detail hereinbelow, in the present embodiment, the ratio ($I_B/I_S$) of the component amount of the LiBOB skeleton component to the component amount of the fluorosulfonic acid skeleton component in the negative electrode SEI film 29 is adjusted to a predetermined value. Here, the amount of LiBOB in the nonaqueous electrolytic solution is adjusted so as to satisfy the ratio of the above component amounts. Specifically, the lower limit of the amount of LiBOB is 0.01% by mass or more, 0.05% by mass or more, or even 0.1% by mass or more, with the total amount of the nonaqueous electrolytic solution being 100% by mass. Further, the upper limit is 3% by mass or less, 2% by mass or less, or even 1.7% by mass or less, with the total amount of the nonaqueous electrolytic solution being 100% by mass.

(c-2) Fluorosulfonate

The nonaqueous electrolytic solution in the present embodiment includes a fluorosulfonate. By including a fluorosulfonate in the nonaqueous electrolytic solution, it is possible to form the negative electrode SEI film 29 including the fluorosulfonic acid skeleton.

Examples of such a fluorosulfonate include FSO$_3$Li, FSO$_3$Na, FSO$_3$K, FSO$_3$(CH$_3$)$_4$N, FSO$_3$(C$_2$H$_5$)$_4$N, FSO$_3$(n-C$_4$H$_9$)$_4$N, and the like.

Further, the amount of the fluorosulfonate is adjusted so that the ratio ($I_B/I_S$) of the component amount of the LiBOB skeleton component to the component amount of the fluorosulfonic acid skeleton component in the negative electrode SEI film 29 assumes a predetermined value. Specifically, the lower limit of the amount of the fluorosulfonate is 0.01% by mass or more, 0.05% by mass or more, or even 0.1% by mass or more, with the total amount of the nonaqueous electrolytic solution being 100% by mass. Further, the upper limit is 3% by mass or less, 2.5% by mass or less, or even 2% by mass or less, with the total amount of the nonaqueous electrolytic solution being 100%/by mass.

(c-3) Oxofluorophosphate

The nonaqueous electrolytic solution in the present embodiment includes an oxofluorophosphate. As a result of including an oxofluorophosphate in the nonaqueous electrolytic solution, the positive electrode SEI film 19 having a phosphoric acid skeleton can be formed on the surface of the positive electrode active material 18.

Examples of such oxofluorophosphates include $Li_2PO_3F$, $LiPO_2F_2$, $NaPO_2F_2$, $KPO_2F_2$, and the like. The amount of the oxofluorophosphate is adjusted so that a suitable positive electrode SEI film 19 is formed. Specifically, the lower limit of the amount of the oxofluorophosphate is 0.01% by mass or more, 0.05% by mass or more, or even 0.1% by mass or more, with the total amount of the nonaqueous electrolytic solution being 100% by mass. Further, the upper limit value is 3% by mass or less, 2.5% by mass or less, or even 2% by mass or less, with the total amount of the nonaqueous electrolytic solution being 100% by mass.

2. SEI Film

As described above, in the lithium ion secondary cell 100 according to the present embodiment, the positive electrode SEI film 19 is formed on the surface of the positive electrode active material 18, and the negative electrode SEI film 29 is formed on the surface of the negative electrode active material 28. These SEI films are formed by using the nonaqueous electrolytic solution to which the abovementioned film forming agents have been added and performing initial charging and aging treatment under predetermined conditions, so that the following formula (1) and (2) are satisfied.

$$4 \leq I_B/I_S \leq 10 \quad (1)$$

$$5 \ \mu mol/m^2 \leq I_P \leq 15 \ \mu mol/m^2 \quad (2)$$

(a) Negative Electrode SEI Film

As described above, the LiBOB skeleton component and the fluorosulfonic acid skeleton component are present in the negative electrode SEI film 29 in the present embodiment.

Where the LiBOB skeleton component in the negative electrode SEI film 29 increases, the decrease in cell capacity due to decomposition of the electrolytic solution can be suppressed, whereas the movement speed of Li ions in the negative electrode SEI film 29 may decrease and the cell resistance may rise.

Meanwhile, where the fluorosulfonic acid skeleton component having a suitable component amount is present in the negative electrode SEI film 29, the movement speed of Li ions in the negative electrode SEI film 29 is improved, and the increase in cell resistance caused by the decrease in the movement speed of Li ions can be suppressed.

The above formula (1) is set based on this viewpoint, and the ratio ($I_B/I_S$) of the component amount $I_B$ of the LiBOB skeleton component to the component amount $I_S$ of the fluorosulfonic acid skeleton component is established as 4 or more and 10 or less. As a result, it is possible to suitably prevent the decrease in cell capacity due to decomposition of the electrolytic solution, in addition to suppressing the increase in cell resistance caused by the decrease in the movement speed of Li ions. From the viewpoint of more effectively exhibiting the effect of the present embodiments, the value of $I_B/I_S$ may be set to 5 or more and 8 or less, or even to 6 or more and 7 or less.

(b) Positive Electrode SEI Film

As described above, in the lithium ion secondary cell 100 according to the present embodiment, the positive electrode SEI film 19 having a phosphoric acid skeleton is formed on the surface of the positive electrode active material 18. This makes it possible to prevent the transition metal element from eluting from the positive electrode active material 18 and appropriately prevent the reaction resistance of the negative electrode 20 from rising due to precipitation of the transition metal element on the surface of the negative electrode active material 28.

However, where the positive electrode SEI film 19 having the phosphoric acid skeleton is excessively formed on the surface of the positive electrode active material 18, the movement speed of Li ions in the positive electrode 10 decreases, and the cell resistance may increase.

The above formula (2) is set based on this viewpoint, and by adjusting the component amount $I_P$ of the phosphoric acid skeleton of the positive electrode SEI film 19 to 5 $\mu mol/m^2$ or more and 15 $\mu mol/m^2$ or less, the increase in reaction resistance due to elution of the transition metal element can be suitably suppressed without causing the increase in cell resistance due to a decrease in the movement speed of Li ions.

From the viewpoint of more advantageously bringing out the effects of the present disclosure, the component amount $I_P$ of the phosphoric acid skeleton may be set to 6 $\mu mol/m^2$ or more and 10 $\mu mol/m^2$ or less, or even 7 $\mu mol/m^2$ or more and 9 $\mu mol/m^2$ or less (for example, 8 $\mu mol/m^2$).

As described above, with the lithium ion secondary cell 100 of the present embodiment, by forming the negative electrode SEI film 29 in which $I_B/I_S$ is adjusted so as to satisfy the above formula (1), the decrease in cell capacity due to decomposition of the electrolytic solution can be prevented without lowering the movement speed of Li ions.

In addition, by forming the positive electrode SEI film 19 in which $I_P$ is adjusted so as to satisfy the above formula (2), the increase in reaction resistance due to elution of the transition metal element can be suitably suppressed without lowering the movement speed of Li ions.

As described above, the lithium ion secondary cell 100 according to the present embodiment is improved in various cell performances as compared with the conventional nonaqueous electrolyte secondary cells, and therefore can be suitably used for a high-output power supply for vehicles.

Test Examples

Hereinafter, test examples relating to the present disclosure will be described, but the description of the test examples is not intended to limit the present disclosure.

A. First Test

1. Test Examples

In the first test, 20 lithium ion secondary cells (Test Examples 1 to 20) having different values of the ratio ($I_B/I_S$) of the component amount $I_B$ of the LiBOB skeleton component to the component amount $I_S$ of the fluorosulfonic acid skeleton component and the component amount $I_P$ of the phosphoric acid skeleton component were prepared.

Specifically, first, a positive electrode active material ($Li_{1+x}Ni_{1/3}Co_{1/3}Mn_{1/3}O_2$), a conductive material (acetylene black: AB) and a binder (polyvinylidene fluoride: PVdF) were mixed at ratios of 90:8:2, and the mixture was dispersed in a dispersion medium (N-methylpyrrolidone: NMP) to prepare a positive electrode mixture paste.

Then, the positive electrode mixture paste was applied to both surfaces of a positive electrode current collector (aluminum foil), and then dried and rolled to prepare a sheet-shaped positive electrode.

Next, in the present test example, particulate natural graphite (amorphous coated spherical natural graphite) surface-coated with amorphous carbon was used as a negative electrode active material, and then, the negative electrode active material, a thickener (carboxymethyl cellulose: CMC) and a binder (styrene butadiene rubber: SBR) were mixed at ratios of 98:1:1, and the mixture was dispersed in a dispersion medium (water) to prepare a negative electrode mixture paste.

Then, the negative electrode mixture paste was applied to both surfaces of a negative electrode current collector (copper foil), and then dried and rolled to prepare a sheet-shaped negative electrode.

Next, the positive electrode and the negative electrode prepared as described above were laminated with a sheet-shaped separator interposed therebetween, and then the laminate was wound and pressed to produce a flat wound electrode body. Then, the produced wound electrode body was connected to electrode terminals (positive electrode terminal and negative electrode terminal) and then housed inside a cell case. The separator used in this test example had a three-layer structure (PP/PE/PP) separator in which a polyethylene (PE) layer was sandwiched between two polypropylene (PP) layers.

Next, the inside of the cell case was impregnated with a nonaqueous electrolytic solution obtained by including a supporting salt ($LiPF_6$) at a concentration of about 1 mol/L in a mixed solvent including ethylene carbonate (EC), dimethyl carbonate (DMC) and ethyl methyl carbonate (EMC) in volume ratios of 3:3:4.

Here, LiBOB, fluorosulfonate ($FSO_3Li$) and lithium difluorophosphate ($LiPO_2F_2$) were added as film forming agents to the nonaqueous electrolytic solution in the present test example. The addition amounts of the three kinds of film forming agents were different in each of Test Examples 1 to 20.

Next, the case main body and the lid member were welded to each other to prepare a test lithium ion secondary cell. Then, after initial charging (1 C, 4.1 V), aging treatment (60° C., 20 hr) was performed to prepare a lithium ion secondary cell in which a predetermined SEI film was formed. Further, "1 C" of the charging rate of initial charging in the present test is 4.1 A.

2. Evaluation Tests (1) Component Analysis of SEI Film

For the cells of Test Examples 1 to 20 described above, discharging was performed until the potential between the terminals of the positive electrode and the negative electrode reached 3 V (state with SOC 0%). Then, the cell case was disassembled and the positive electrode and the negative electrode were taken out. Then, the extracted positive electrode and negative electrode were washed with ethyl methyl carbonate (EMC) and then cut into a size of 15 mm×15 mm to prepare a sample for analysis.

Ion chromatography (IC) was performed on the sample for analysis of the negative electrode, the amount of $FSO_3^-$ present in the negative electrode was measured, and the component amount of $FSO_3^-$ ($\mu mol/m^2$) related to the BET specific surface area of the negative electrode active material was defined as the "component amount $I_S$ of fluorosulfonic acid skeleton". In addition, an emission spectroscopic analysis method using inductively coupled plasma (ICP) was performed on the sample for analysis of the negative electrode, the component amount of boron (B) present in the negative electrode was measured, and the component amount ($\mu mol/m^2$) of boron (B) related to the BET specific surface area of the negative electrode active material was defined as the "component amount $I_B$ of the LiBOB skeleton". Then, $I_B/I_S$ was calculated based on these measurement results. The measurement results are shown in Table 1.

Meanwhile, ion chromatography (IC) was performed on the sample for analysis of the positive electrode, and the component amount of each of $PO_3F^-$, $PO_2F_2^-$, and $PO_4^{3-}$ present in the positive electrode was measured. Then, the sum total of these component amounts was defined as the "component amount $I_P$ of the phosphoric acid skeleton". The measurement results of the component amount $I_P$ of the phosphoric acid skeleton are shown in Table 1.

(2) Low-Temperature Resistance after Durability Test

Here, in order to evaluate the cell performance of the lithium ion secondary cells of Test Examples 1 to 20, the low-temperature resistance (mΩ) after a high-temperature durability test was measured. Specifically, first, a high-temperature durability test in which the lithium ion secondary cell of each test example was stored for 100 days at 60° C. was performed. Then, the SOC of each cell after the durability test was adjusted to 50%, charging IV resistance was measured for 10 sec under an environment of −30° C., and the measurement result was taken as the "low-temperature resistance after durability test".

Figure 4:
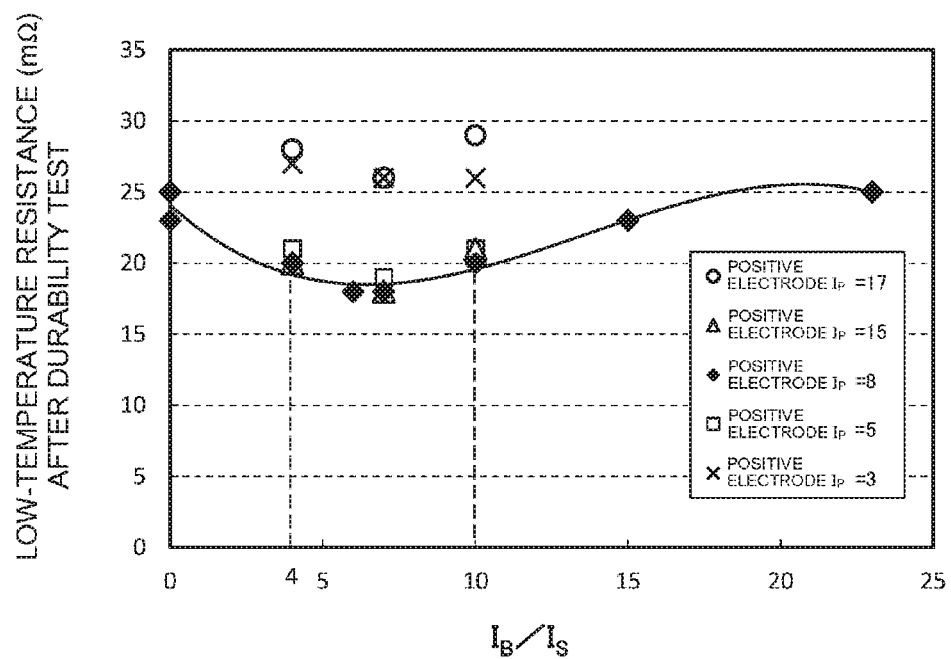
FIG. 4 is a graph illustrating measurement results of low-temperature resistance after a durability test in the lithium ion secondary cells of Test Examples 1 to 20.

The measurement result of the low-temperature resistance after the above durability test is shown in Table 1 and FIG. 4. In FIG. 4, the low-temperature resistance (mΩ) after the durability test is plotted against the ordinate, and $I_B/I_S$ of the negative electrode SEI film is plotted against the abscissa. Among the plots in FIG. 4, "x" represents a test example in which the $I_P$ of the positive electrode SEI film was 3 $\mu mol/m^2$, and "□" represents a test example in which it was 5 $\mu mol/m^2$. In addition, "◆" represents a test example in which the $I_P$ of the positive electrode SEI film was 8 $\mu mol/m^2$, and "Δ" represents a test example in which it was 15 $\mu mol/m^2$. Further, the plot "O" shows a test example in which the $I_P$ of the positive electrode SEI film was 17 $\mu mol/m^2$.

TABLE 1

| Test Example | $I_B/I_S$ of negative electrode SEI film | $I_P$ of positive electrode SEI film ($\mu mol/m^2$) | Low-temperature resistance after durability test (mΩ) |
| --- | --- | --- | --- |
| 1 | 7 | 8 | 18 |
| 2 | 10 | 8 | 20 |
| 3 | 4 | 8 | 20 |
| 4 | 6 | 8 | 18 |
| 5 | 15 | 8 | 23 |
| 6 | 23 | 8 | 25 |
| 7 | 0 | 8 | 23 |
| 8 | 0 | 8 | 25 |
| 9 | 4 | 5 | 21 |
| 10 | 7 | 5 | 19 |
| 11 | 10 | 5 | 21 |
| 12 | 4 | 15 | 20 |
| 13 | 7 | 15 | 18 |
| 14 | 10 | 15 | 21 |
| 15 | 4 | 17 | 28 |
| 16 | 7 | 17 | 26 |
| 17 | 10 | 17 | 29 |

TABLE 1-continued

| Test Example | $I_B/I_S$ of negative electrode SEI film | $I_P$ of positive electrode SEI film (μmol/m²) | Low-temperature resistance after durability test (mΩ) |
|---|---|---|---|
| 18 | 4 | 3 | 27 |
| 19 | 7 | 3 | 26 |
| 20 | 10 | 3 | 26 |

As shown in Table 1 and FIG. 4, when comparing Test Examples 1 to 8, in Test Examples 5 and 6 in which $I_B/I_S$ of the negative electrode SEI film exceeded 10, the low-temperature resistance after the durability test greatly increased and significant decrease in cell performance was observed. This is considered to be due to the fact that the component amount of the LiBOB skeleton component was too large and the movement speed of Li ion in the negative electrode SEI film was lowered.

Also in Test Examples 7 and 8 in which $I_B/I_S$ of the negative electrode SEI film was less than 4, the low-temperature resistance after the durability test has greatly increased, and a significant decrease in cell performance was observed. This is considered to be due to the fact that the component amount of the LiBOB skeleton component was too small and the capacity deterioration due to decomposition of the electrolytic solution occurred.

Meanwhile, in Test Examples 1 to 4 in which $I_B/I_S$ of the negative electrode SEI film was set within the range of 4 to 10, the increase in low-temperature resistance after durability was suppressed. From this, it was understood that when an SEI film is formed on the surface of the negative electrode active material, the negative electrode SEI film in which a LiBOB skeleton and a fluorosulfonic acid skeleton are present may be formed and the ratio ($I_B/I_S$) of the component amounts thereof may be set to be 4 or more and 10 or less, and in this case, suitable cell performance can be maintained.

Meanwhile, when comparing Test Examples 9 to 20, in Test Examples 15 to 17 in which the $I_P$ of the positive electrode SEI film exceeded 15 even though $I_B/I_S$ was set to 4 or more and 10 or less, the low-temperature resistance after the durability test was greatly increased, and the cell performance remarkably decreased. This is considered to be due to the fact that the positive electrode SEI film was formed in excess and the movement speed of Li ions in the positive electrode was lowered.

Also, in Test Examples 18 to 20 in which the $I_P$ of the positive electrode SEI film is less than 5, a significant deterioration of cell performance was observed. This is considered to be due to the fact that the formation of the positive electrode SEI film was insufficient and elution of the transition metal element from the positive electrode active material could not be prevented.

In Test Examples 9 to 14 in which the $I_P$ of the positive electrode SEI film was set within the range of 5 μmol/m² to 15 μmol/m², a significant decrease in cell performance was suitably suppressed. From this, it was understood that when an SEI film is formed on the surface of the positive electrode active material, the phosphoric acid skeleton may be present in the positive electrode SEI film and that the component amount $I_P$ of the phosphoric acid skeleton be adjusted to the range of 5 μmol/m² to 15 μmol/m², and in this case, suitable cell performance can be maintained.

Although the present disclosure has been described in detail, the embodiments are merely exemplary, and the present disclosure is inclusive of various changes and modifications of the above-described specific examples.

B. Second Test

1. Test Examples

In the second test, six lithium ion secondary cells (Test Examples 21 to 26) having different compositions of the SEI film were prepared by preparing six lithium ion secondary cells (cell assembly) before initial charging under the same conditions and according to the same procedure as in Test Example 1 shown in the first test hereinabove and setting different conditions of initial charging and aging treatment for each cell. Specifically, in Test Examples 21 to 26, the charging rate (C) of initial charging and the aging time (hr) were changed as shown in Table 2 hereinbelow. Further, the temperature of aging treatment was unified at 60° C. for all test examples. The charging rate and aging time used in Test Example 1 of the first test are also shown in Table 2 for comparison.

TABLE 2

| Test Example | Charging rate (C) | Aging time (hr) |
|---|---|---|
| 1 | 1.0 | 20 |
| 21 | 0.1 | 20 |
| 22 | 1.0 | 0 |
| 23 | 1.0 | 5 |
| 24 | 1.0 | 16 |
| 25 | 1.0 | 200 |
| 26 | 5.0 | 20 |

2. Evaluation Tests

The component analysis of the SEI film was performed and the low-temperature resistance after the durability test was measured in the same manner as in the above-described first test. The results are shown in Table 3. Since the conditions of the evaluation tests are the same as in the first test, detailed explanation thereof is herein omitted.

TABLE 3

| Test Example | $I_B/I_S$ of negative electrode SEI film | $I_P$ of positive electrode SEI film (μmol/m²) | Low-temperature resistance after durability test (mΩ) |
|---|---|---|---|
| 1 | 7 | 8 | 18 |
| 21 | 3 | 10 | 23 |
| 22 | 3 | 7 | 25 |
| 23 | 3 | 9 | 23 |
| 24 | 6 | 8 | 19 |
| 25 | 10 | 12 | 19 |
| 26 | 7 | 9 | 20 |

As shown in Table 3, it was confirmed that even when the conditions of initial charging or aging treatment were changed, the $I_B/I_S$ of the negative electrode SEI film and the $I_P$ of the positive electrode SEI film could change. Further, it was confirmed that, in the same manner as in the first test, in the cells (Test Examples 1 and 24 to 26) in which the $I_B/I_S$ of the negative electrode SEI film was in the range of 4 to 10, and the $I_P$ of the positive electrode SEI film was in the range of 5 μmol/m² to 15 μmol/m², the increase in low-temperature resistance after the durability test was suppressed.

What is claimed is:

1. A nonaqueous electrolyte secondary cell comprising:
a positive electrode having a positive electrode active material made of a lithium transition metal complex oxide; a negative electrode having a negative electrode active material made of a carbon material; and a nonaqueous electrolytic solution including a nonaqueous solvent and a supporting salt, wherein
a negative electrode SEI film including at least a LiBOB skeleton and a fluorosulfonic acid skeleton is formed on a surface of the negative electrode active material, and a positive electrode SEI film including at least a phosphoric acid skeleton is formed on a surface of the positive electrode active material, and
where a value obtained by measuring a component amount of boron (B) in the negative electrode by inductively coupled plasma (TCP) emission spectroscopic analysis, normalized with respect to a BET specific surface area of the negative electrode active material, is denoted by $I_B$, a value obtained by measuring a component amount of $FSO_3^-$ in the negative electrode by ion chromatography (IC), normalized with respect to the BET surface area of the negative electrode active material, is denoted by Is, and a value obtained by measuring a total amount of $PO_3F^-$, $PO_2F_2^-$, and $PO_4^{3-}$ in the positive electrode by ion chromatography (IC), normalized with respect to a BET surface area of the positive electrode active material, is denoted by $I_P$, the following formulas (1) and (2) are satisfied:

$$4 \leq I_B/I_S \leq 10 \tag{1}$$

$$5 \ \mu mol/m^2 \leq I_P \leq 15 \ \mu mol/m^2 \tag{2}$$

* * * * *